(12) United States Patent
Ouchi

(10) Patent No.: US 6,394,250 B1
(45) Date of Patent: May 28, 2002

(54) ALTERNATOR PULLEY UNIT WITH A BUILT-IN ONE-WAY CLUTCH

(75) Inventor: Hideo Ouchi, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/612,966

(22) Filed: Jul. 10, 2000

(30) Foreign Application Priority Data

Jul. 9, 1999 (JP) .......................................... 11-195682

(51) Int. Cl.$^7$ .............................................. F16D 41/06
(52) U.S. Cl. ..................................... 192/45; 192/110 B
(58) Field of Search .............................. 192/41 R, 45, 192/110 B; 474/70, 74; 310/100

(56) References Cited

U.S. PATENT DOCUMENTS

| | | | | |
|---|---|---|---|---|
| 4,725,259 A | * | 2/1988 | Miyata | 474/70 |
| 5,676,225 A | * | 10/1997 | Miyata | 192/41 R |
| 6,093,991 A | * | 7/2000 | Tanaka | 310/100 |
| 6,237,736 B1 | * | 5/2001 | Ouchi | 192/41 R |
| 6,257,385 B1 | * | 7/2001 | Ouchi | 192/45 |

FOREIGN PATENT DOCUMENTS

| | | |
|---|---|---|
| JP | 10-281261 | 10/1998 |
| JP | 10-285873 | 10/1998 |

* cited by examiner

*Primary Examiner*—Richard M. Lorence
(74) *Attorney, Agent, or Firm*—Crowell & Moring LLP

(57) ABSTRACT

One-way clutch 18 has a spring the elastic modulus of which is limited up to a predetermined value, seal rings 36a, 36b have a sliding resistance with respect to the inner rings 22 which is limited up to a predetermined value, and support bearings 17a, 17b have a rotation resistance which is limited up to a predetermined value. The torque required to rotate the driven pulley 7a relative to the sleeve 8a in the direction for overrun condition is limited up to 0.5N·m. Accordingly, the power generating efficiency of the alternator is secured while abnormal sounds are prevented from occurring with the life of endless belt being prevented from reducing.

4 Claims, 6 Drawing Sheets

ALTERNATOR PULLEY UNIT WITH A BUILT-IN ONE-WAY CLUTCH

FIELD OF THE INVENTION

An alternator pulley unit with a built-in one-way clutch of the present invention is utilized for driving an alternator serving as a generator for vehicles, by fixing the pulley unit to an end of a rotation shaft of the alternator, and spanning an endless belt between the pulley unit and a drive pulley fixed to an end of a crank shaft of an engine.

BACKGROUND OF THE INVENTION

A structure of an alternator for generating electric power required for an automobile using the automobile propulsion engine as a drive source is described for example in Japanese Patent Publication No. Tokukai Hei7-139550. FIG. 5 shows the alternator described in this Application. A rotation shaft 3 is rotatably supported inside a housing 2 by a pair of rolling bearings 4. A rotor 5 and a commutator 6 are disposed on an intermediate part of the rotation shaft 3. In addition, a driven pulley 7 is fixed to a portion protruding toward the outside of the housing 2, at one end (the right end in FIG. 5) of the rotation shaft 3. In the condition where it is assembled into an engine, an endless belt is spanned around the driven pulley 7, and the rotation shaft 3 is freely rotated by the engine crank shaft.

For the above described driven pulley 7, one which is simply fixed to the rotation shaft 3 has heretofore been used. On the other hand, various kinds of alternator pulley unit with a built-in one-way clutch have been proposed and used in part, such as one in which when the running speed of the endless belt is constant or tends to increase, motive power is freely transmitted from the endless belt to the rotation shaft, while when the running speed of the endless belt tends to decrease, the driven pulley and the rotation shaft are freely rotatable relative to each other. An alternator pulley unit with a built-in one-way clutch having functions described above, is described for example in Japanese Patent Publication Nos. Tokukai Sho56-101353, Tokukai Hei7-3178807, Tokukai Hei8-61443, Tokukai Hei10-285873, Japanese Patent Publication No. Tokuko Hei 7-72585, France Patent Publication No. FR2726059A1 and the like. Moreover, such an alternator pulley unit with a built-in one-way clutch has been actually used in part.

FIG. 6 shows an alternator pulley unit with a built-in one-way clutch described in Japanese Patent Publication No. Tokukai Hei10-285873. This alternator pulley unit with a built-in one-way clutch has a sleeve 8 that can be freely externally fitted and secured to a rotation shaft 3 (FIG. 5). A driven pulley 7a is then disposed concentric with the sleeve 8 around the sleeve 8. In addition, a pair of support bearings 9 and a one-way clutch 10 are provided between an outer peripheral face of the sleeve 8 and an inner peripheral face of the driven pulley 7a. Of these, the support bearings 9 enable free rotation of the sleeve 8 and the driven pulley 7a relative to each other, while rotatably supporting a radial load applied to the driven pulley 7a.

Moreover, the one-way clutch 10 can transmit a turning force from the driven pulley 7a to the sleeve 8 only when the driven pulley 7a has a tendency to rotate in a predetermined direction relative to the sleeve 8. Therefore, to construct the aforementioned one-way clutch 10, a cam face 12 is formed on an outer peripheral face of an intermediate portion of an inner ring 11 which is externally fitted and secured to the sleeve 8. Furthermore a plurality of rollers 13 are arranged between the outer peripheral face of the cam face 12 and the inner peripheral face of the driven pulley 7a. Then, between these rollers 13 and a retainer 14 for retaining these rollers 13, there are provided a plurality of springs (not shown). These springs resiliently press the respective rollers 13 in a direction to make the respective rollers 13 encroach into a wedge shape at a portion where, of the dimensions of a cylindrical gap formed between the outer peripheral face of the cam face 12 and the inner peripheral face of the driven pulley 7a, the width across the diametrical direction becomes narrow. Furthermore, a torque for pressing the respective rollers 13 based on the resilience is designated as 4N·m or less.

According to the alternator pulley unit with a built-in one-way clutch described in the above described Japanese Patent Publication No. Tokukai Hei10-285873 constituted as described above, generating efficiency of the alternator can be ensured to some degree. That is to say, when the rotational speed of the engine increases, and the running speed of the endless belt 15 spanning between the drive pulley and the driven pulley 7a tends to increase, there is a tendency for the driven pulley 7a to rotate relative to the sleeve 8 in a predetermined direction. As a result, the respective rollers 13 encroach into the wedge shape (become locked) at the portion where, of dimensions of the cylindrical gap formed between the outer peripheral face of the inner ring 11 and the inner peripheral face of the driven pulley 7a, the width across the diametral direction becomes narrow, thereby enabling free transmission of the turning force from the driven pulley 7a to the rotation shaft 3. On the other hand, when the rotational speed of the engine decreases, and the running speed of the endless belt 15 tends to decrease, the driven pulley 7a rotates relative to the sleeve 8 in the direction opposite to the above described predetermined direction. Therefore, the respective rollers 13 shift to a portion where the width of the above described cylindrical gap becomes wider, enabling free rolling of these respective rollers 13 in the concerned portion (giving an overrun state), so that the driven pulley 7a and the rotation shaft 3 can freely rotate relative to each other. At this time, since the respective rollers 13 are pressed by means of a torque of 4N·m or less based on the resilience of the aforesaid respective springs, shift from the locked state to the overturn state can be performed at a relatively early stage from when the running speed of the endless belt 15 starts to decrease. Since the shift to the overrun state is performed at a relatively early stage as described above, the rotation shaft 3 of the alternator can continue to rotate in a high region to some extent based on its own rotational force of inertia, regardless of variations in the rotational speed of the engine, sot hat the power generating efficiency of the alternator can be ensured to some degree.

In the case of the alternator pulley unit with a built-in one-way clutch described in Japanese Patent Publication No. Tokukai Hei10-285873 constituted and operated as described above, it still cannot be said that the power generating efficiency is sufficiently ensured. In addition, there is the possibility of the occurrence of abnormal sounds due to rubbing of the driven pulley 7a and the endless belt 15 against each other, and a decrease in the life span of the endless belt 15 cannot be sufficiently prevented. That is to say, since the crank shaft is rotated and driven based on intermittent explosions inside the engine cylinder, completely smooth rotational motion is not performed, and the turning angular velocity varies slightly even during one rotation. The variation in the turning angular velocity increases as the rotational speed of the engine decreases. As a result, the running speed of the endless belt 15 spanning to the drive pulley secured at the end of the crank shaft also varies slightly. Therefore, to ensure sufficient power generating efficiency of the alternator, it is necessary to make the pulley unit follow the slight variations in the running speed of the endless belt 15, and to promptly perform the shift from the locked state to the overrun state when the running speed of the endless belt 15 tends to decrease.

On the other hand, even if the running speed of the endless belt 15 varies slightly as described above, the rotation shaft 3 of the alternator rotated and driven via the driven pulley 7a by the endless belt 15 does not vary so abruptly, based on the rotational force of inertia of the rotation shaft 3, and the rotor 5 and the commutator 6 secured to the rotation shaft 3. Hence, there is a tendency for the inner peripheral face of the endless belt 15 and the outer peripheral face of the driven pulley 7a to rub against each other in opposite directions. As a result, a stress in different directions acts repeatedly on the endless belt 15 which is rubbed against the driven pulley 7a, so that slipping occurs between the endless belt 15 and the driven pulley 7a. Hence, abnormal sounds are likely to occur due to this slipping, or the life span of the endless belt 15 is shortened.

The decrease in life span of the endless belt 15 based on the friction between the outer peripheral face of the driven pulley 7a and the inner peripheral face of the endless belt 15 as described above actually arises also due to repeated acceleration and deceleration at the time of traveling. That is to say, at the time of acceleration, a drive force is transmitted from the endless belt 15 to the driven pulley 7a, while on the contrary, at the time of deceleration, a braking force acts from the endless belt 15 on the driven pulley 7a that tends to continue rotation based on the inertia described above. The braking force and the above described drive force act on the inner peripheral face of the endless belt 15 as a frictional force in opposite directions, resulting in a decrease in the life span of the endless belt 15. In particular, in the case of a vehicle provided with an exhaust brake such as a truck, the deceleration at the time of decreasing rotation of the crank shaft in the accelerator-off state is considerable. Based on the above described braking force, a frictional force applied on the inner peripheral face of the endless belt 15 increases, and as a result, the life span decreases noticeably.

To solve the various problems described above, it has been heretofore proposed to use a pulley with a built-in one-way clutch as the pulley for an alternator. In the case of the structure described in the aforementioned Japanese Patent Publication No. Tokukai Hei10-285873 however, the torque for pressing the respective rollers 13 constituting the one-way clutch 10 in a predetermined direction is as large as 4N·m. Therefore, the structure described in Japanese Patent Publication No. Tokukai Hei10-285873 can cope with a relatively large variation in the rotational speed of the engine, but it is unlikely to cope with slight variations in the turning angular velocity occurring during one rotation of the crank shaft. If the pulley unit cannot cope with slight variations in the turning angular velocity of the crank shaft, then not only can the rotation of the rotation shaft 3 of the alternator not be maintained in a high rotation region, but also stress in opposite directions acts repeatedly on the endless belt 15 which is rubbed against the driven pulley 7a as described above. As a result, there is a possibility that the power generating efficiency of the alternator cannot be sufficiently ensured, or that the occurrence of abnormal sounds due to slipping between the endless belt 15 and the driven pulley 7a, and a decrease in the life span of the endless belt 15 cannot be sufficiently prevented.

Moreover, in the case of the alternator pulley unit with a built-in one-way clutch described in Japanese Patent Publication No. Tokukai Hei10-285873, only the size of a torque for pressing the respective rollers 13 constituting the one-way clutch 10 in a predetermined direction is addressed to ensure the power generating efficiency, and this torque value is designated as 4N·m or less. However, when the running speed of the endless belt 15 tends to decrease, and it is necessary to rotate the driven pulley 7a relative to the rotation shaft 3 of the alternator in the direction to give overrun, not only does the torque for pressing the respective rollers 13 in the predetermined direction become an actual resistance to the rotation, but also the rolling rotation resistance of the respective support bearings 9 disposed on opposite sides of the one-way clutch 10, and the sliding resistance of seal members disposed between the driven pulley 7a and the sleeve 8 which are attached to end portions of the respective support bearings 9 becomes an actual resistance to the rotation. Therefore, in the case of the conventional structure described in Japanese Patent Publication No. Tokukai Hei10-285873, the torque necessary to rotate the driven pulley 7a relative to the rotation shaft 3 of the alternator in the direction to give overrun, actually increases to larger than 4N·m. When in this way the torque increases, the torque which becomes a resistance against rotation in the direction to give overrun, suppresses the rotation based on the rotational force of inertia of the rotation shaft 3 or the like. Therefore it becomes more difficult to sufficiently ensure the power generating efficiency of the alternator, or to sufficiently prevent the occurrence of abnormal sounds due to slipping between the endless belt 15 and the driven pulley 7a, and a decrease in the life span of the endless belt 15.

SUMMARY OF THE INVENTION

In view of the above situation, the present invention has been developed for ensuring the power generating efficiency of the alternator and preventing the occurrence of abnormal sounds and a decrease in the life span of the endless belt.

DETAILED DESCRIPTION OF THE PREFERRED EMBODIMENTS

Figure 1:
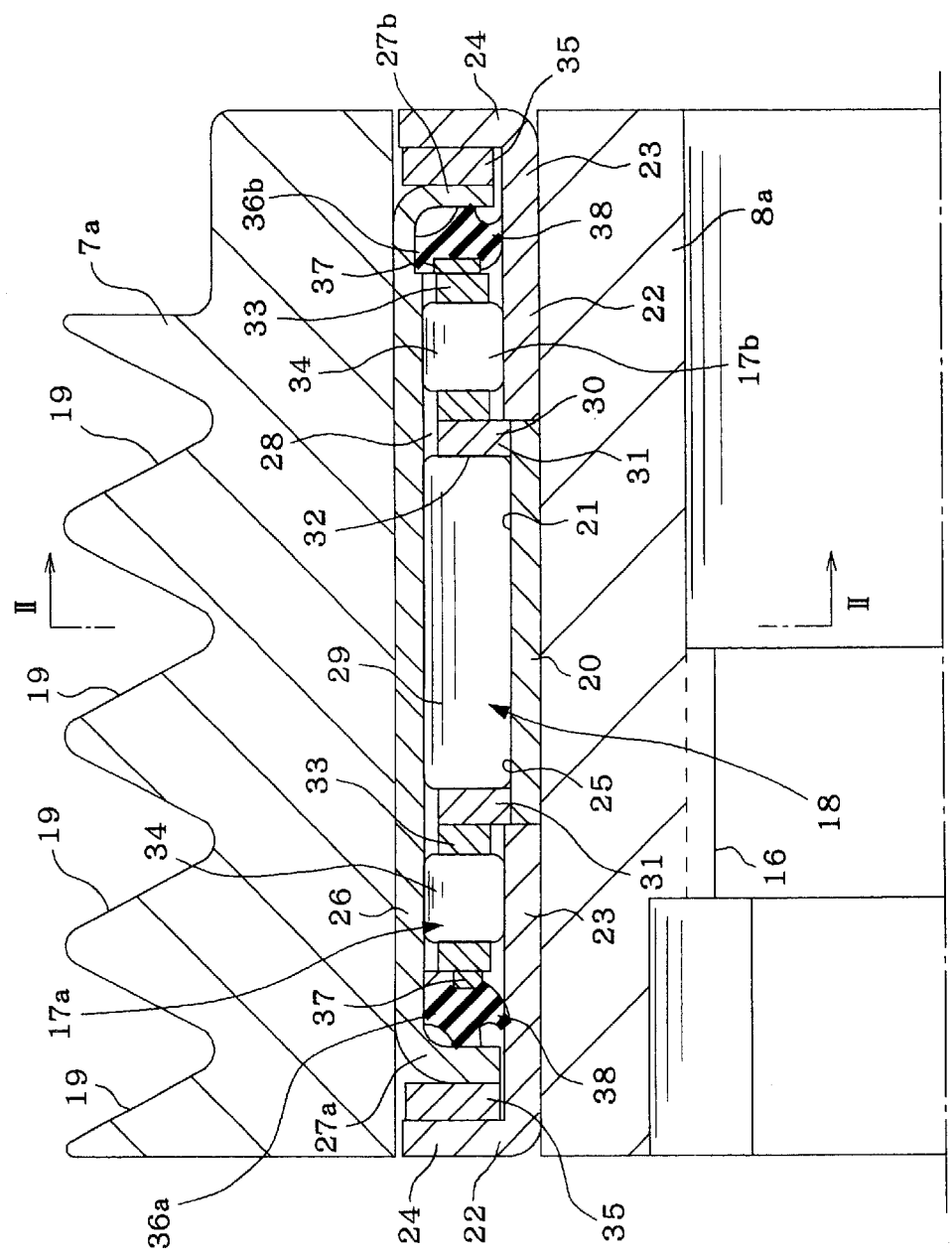
FIG. 1 is a cross sectional view of one half of a first example of the embodiment of the present invention.

An alternator pulley unit with a built-in one-way clutch of the present invention comprises, as with the alternator pulley with a built-in one-way clutch heretofore known: a sleeve that can be freely externally fitted and secured to a rotation shaft of the alternator, a driven pulley disposed concentric with the sleeve around the sleeve; a one-way clutch provided between an axially intermediate portion on an outer peripheral face of the sleeve and an axially intermediate portion on an inner peripheral face of the driven pulley, which can freely transmit a turning force between the driven pulley and the sleeve, only when the driven pulley tends to rotate relative to the sleeve in a predetermined direction; and a pair of support bearings provided between the outer peripheral face of the sleeve and the inner peripheral face of the driven pulley to hold the one-way clutch from the axially opposite sides, which enable free rotation of the sleeve and the driven pulley relative to each other, while rotatably supporting a radial load applied to the driven pulley.

In particular, according to the alternator pulley unit with a built-in one-way clutch of the present invention, a torque necessary for rotating the driven pulley relative to the sleeve in the direction opposite to the predetermined direction is limited up to 0.5N·m, and more preferably, 0.3N·m or less.

In the case of the alternator pulley unit with a built-in one-way clutch of the present invention constructed as described above, a torque necessary for rotating the driven pulley relative to the sleeve in the direction opposite to the predetermined direction is limited up to 0.5N·m (preferably 0.3N·m or less). Therefore, the alternator pulley unit with a built-in one-way clutch of the present invention can sufficiently cope with slight variations in turning angular velocity, so that when the running speed of the endless belt spanning to the driven pulley tends to decrease, the driven pulley and the rotation shaft of the alternator can be promptly and freely rotated relative to each other. As a result, according to the present invention, the power generating efficiency of the alternator can be sufficiently ensured, and the occurrence of abnormal sounds and a decrease in the life span of the endless belt can be sufficiently prevented.

To clarify the grounds from which the above described effects can be obtained by the alternator pulley unit with a built-in one-way clutch of the present invention, a description is given of a test performed by the present inventor. At first, in performing this test, four kinds of alternator pulley units with a built-in one-way clutch heretofore being generally used, were prepared wherein a minimum torque required for rotating the driven pulley relative to the sleeve in the direction opposite to a predetermined direction (in the direction to give overrun) was changed in the range of from 0.3 to 0.6N·m. The test was performed by confirming whether or not the respective pulley unit could follow slight variations in the turning angular velocity occurring during one rotation of the crank shaft, using a stroboscope. Moreover, the rotational speed of the driven pulley was designated as 11,500±80 rpm. Variations in the turning angular velocity occurring during one rotation of the crank shaft were applied by providing a universal joint between the drive pulley and a drive shaft for driving the drive pulley. In addition, the current load of the alternator was designated as 50A. The results of the test performed in this manner are shown in Table 1.

TABLE 1

| Initial Belt Tension | Minimum Torque required for Overrun Condition (N · m) | | | |
|---|---|---|---|---|
| (Kgf) | 0.3 | 0.4 | 0.5 | 0.6 |
| 90 | O | O | O | X |
| 70 | O | O | O | X |
| 50 | O | O | X | X |
| 30 | O | X | X | X |

In Table 1, O denotes that the pulley unit could follow the variations in the turning angular velocity occurring during one rotation of the crank shaft, and rotation of the driven pulley and the sleeve occurred relative to each other, while x denotes that the pulley unit could not follow the variations in the turning angular velocity, and rotation of the driven pulley and the sleeve did not occur relative to each other. As seen from the test results shown in Table 1, in order to make the pulley unit capable of following the variations in the turning angular velocity when the tension of the endless belt is set to 70 kgf, it is required to set the torque necessary for rotating the driven pulley relative to the sleeve in the direction to give overrun, to 0.5N·m or less. Incidentally, the tension of the endless belt is generally set to about 70 kgf. On the other hand, in the case of an actual automobile engine, even if the tension of the endless belt is initially set to 70 kgf, the endless belt itself causes changes with the lapse of time such as a permanent deformation or the like, and as a result there is the possibility that the tension of the endless belt may decrease to about 30 kgf. Therefore, even if the tension of the endless belt decreases to about 30 kgf, it is preferable that the pulley unit can follow the variations in the above described turning angular velocity. As seen from the test results shown in Table 1, in order to make it possible for the pulley unit to follow the variations in the turning angular velocity, even if the tension of the endless belt decreases to about 30 kgf, it is required to set the torque necessary for rotating the driven pulley relative to the sleeve in the direction to give overrun, to 0.3N·m or less. As seen from the test results shown in Table 1, in the case of the present invention, the pulley unit can sufficiently cope with slight variations in the turning angular velocity occurring during one rotation of the crank shaft, to ensure that the power generating efficiency of the alternator, and the occurrence of abnormal sounds and a decrease in the life span of the endless belt can be sufficiently prevented.

Figure 2:
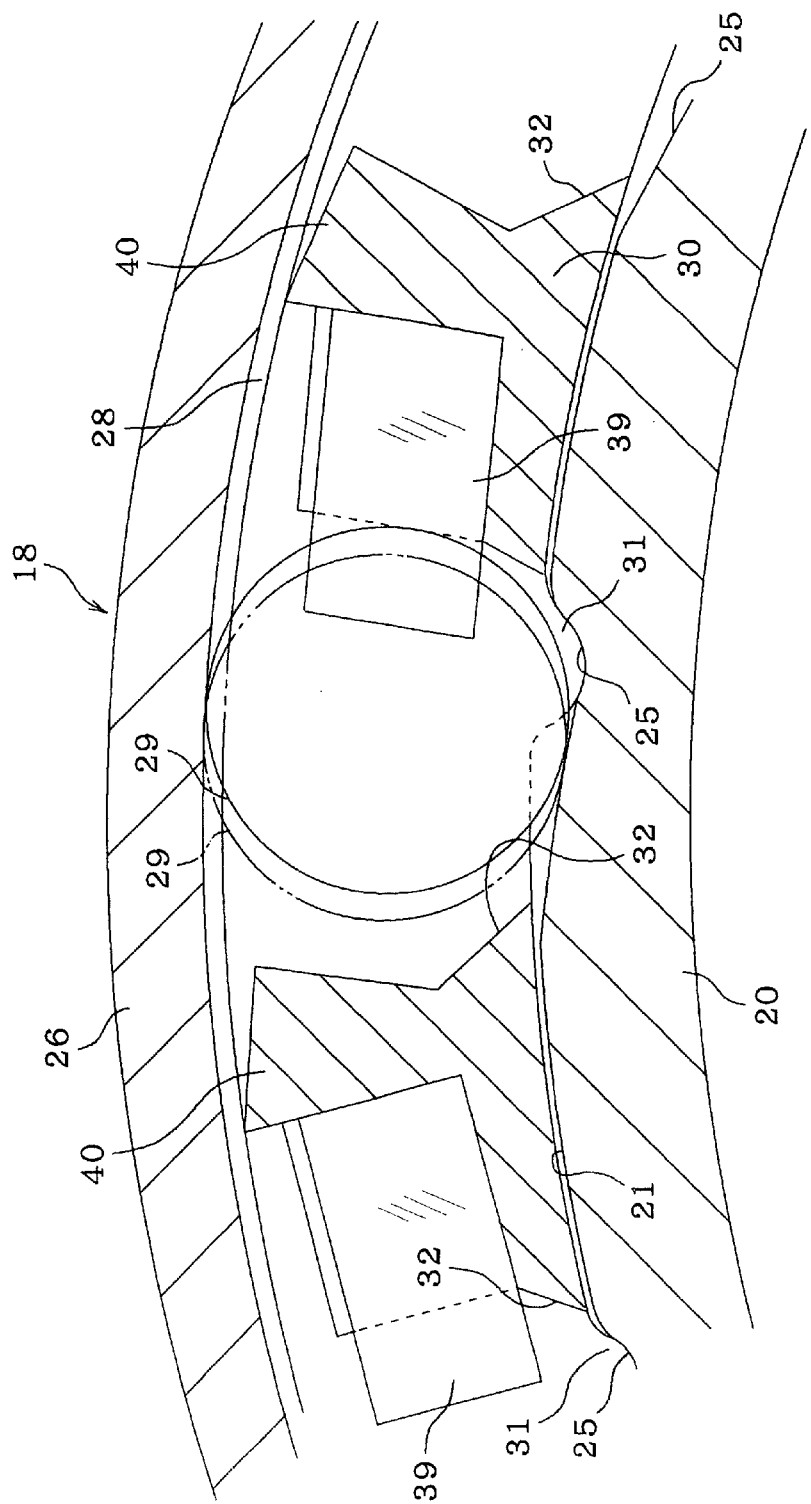
FIG. 2 is a cross sectional view taken along the line II—II of FIG. 1 to show only a one-way clutch.
Figure 5:
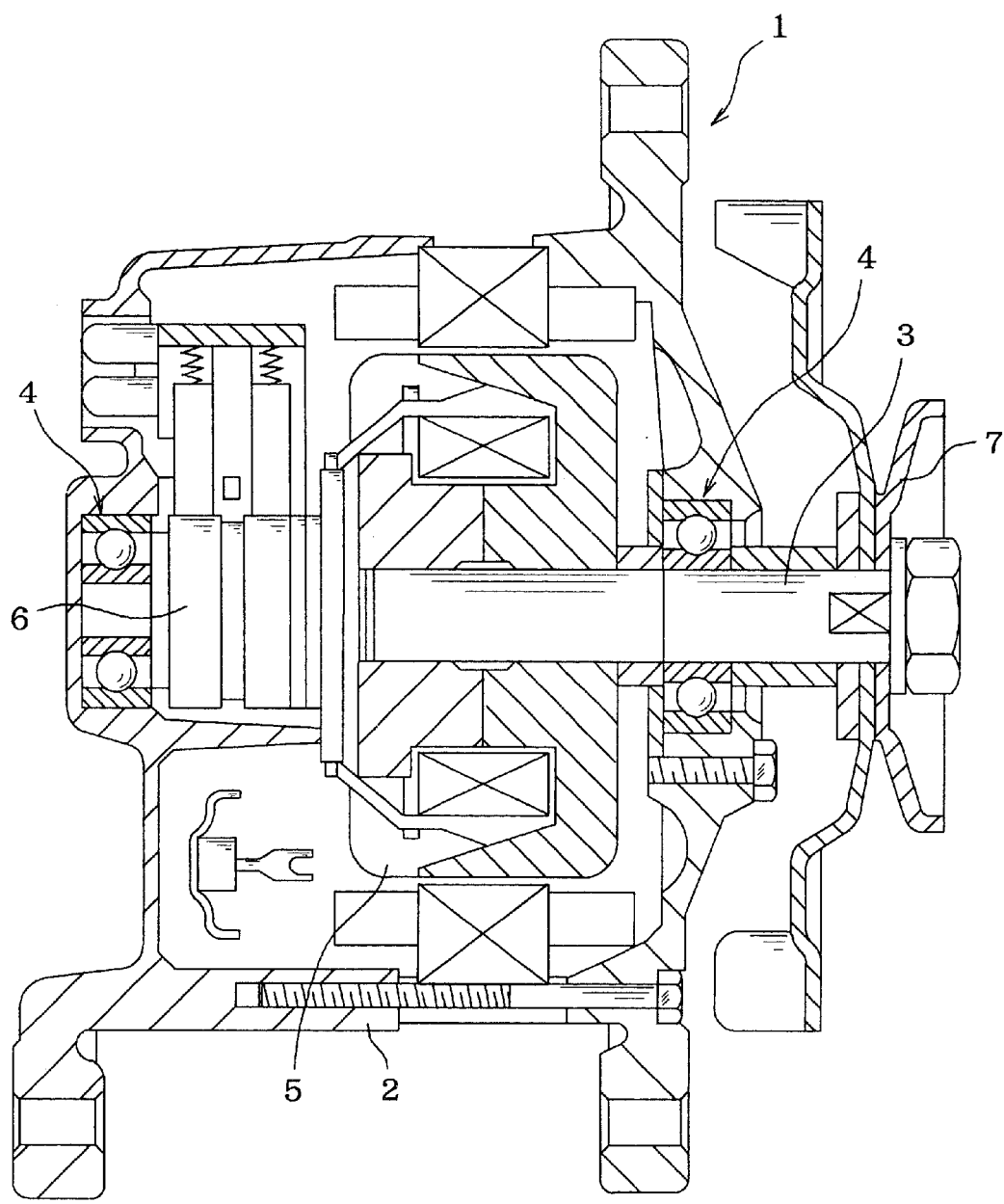
FIG. 5 is a cross sectional view of one example of the conventional alternator.

FIG. 1 and FIG. 2 show a first example of an embodiment of the present invention. An alternator pulley unit with a built-in one-way clutch in this example is formed in an overall cylindrical shape, and comprises a sleeve 8a externally fitted and secured to an end of a rotation shaft 3 (see FIG. 5) of an alternator, and a driven pulley 7a disposed concentric with the sleeve 8a around the sleeve 8a. Of these, the sleeve 8a is freely rotatable together with the rotation shaft 3. Therefore, in the illustrated example, a female spline portion 16 is formed on an inner peripheral face at an intermediate portion of the sleeve 8a, so as to be freely engageable with a male spline (not shown) formed on an outer peripheral face at an end of the rotation shaft 3. Here, instead of using the spline, the structure for preventing rotation of the rotation shaft 3 and the sleeve 8a relative to each other may involve a screw, the fitting of non-cylindrical faces to each other, or connection by a key or the like.

Figure 6:
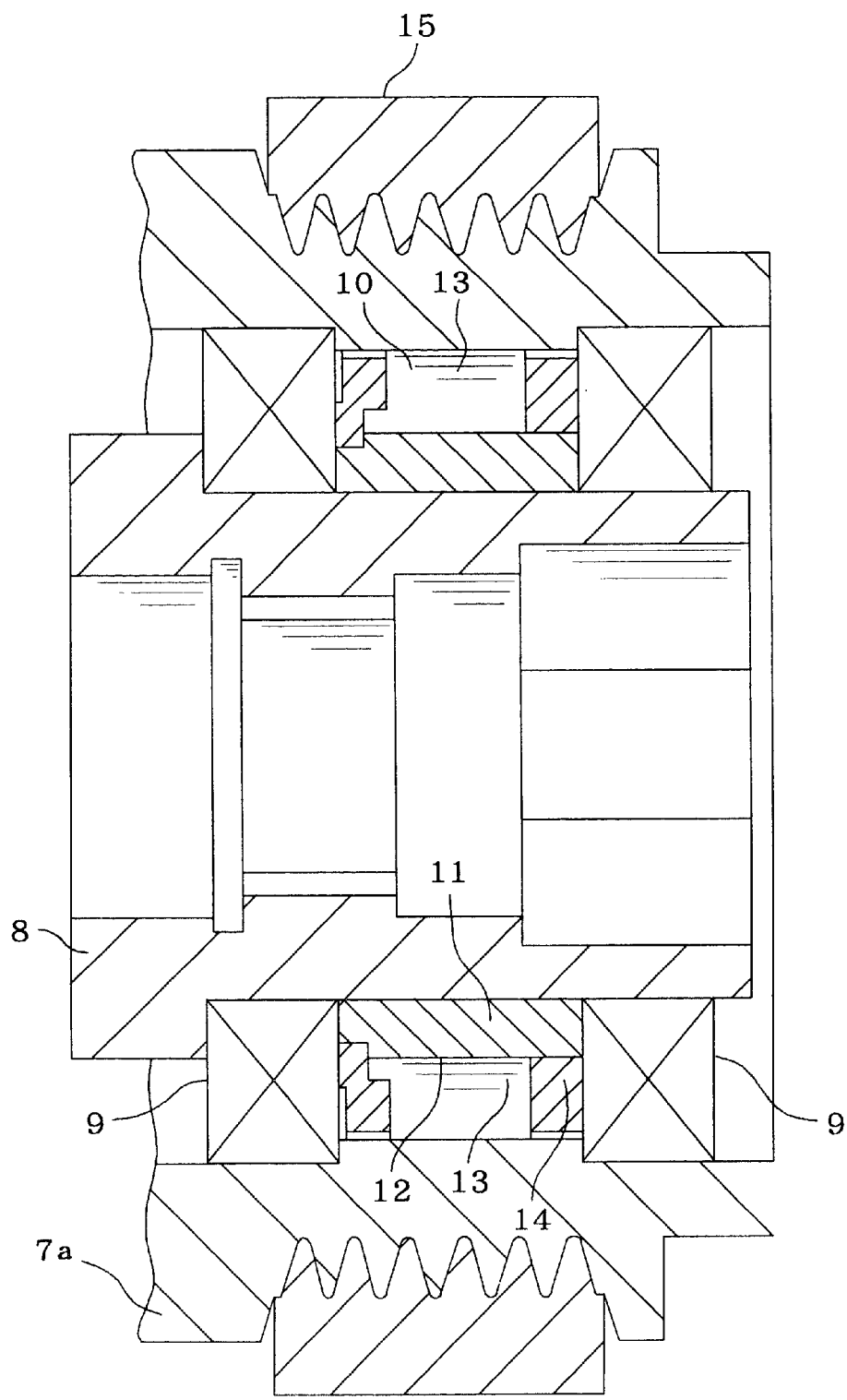
FIG. 6 is a cross sectional view of one example of the conventional alternator pulley unit with a built-in one-way clutch.

The driven pulley 7a disposed around the sleeve 8a described above is mounted with support bearings 17a, 17b described below and a one-way clutch 18 on the inside thereof. On the outer peripheral face of the driven pulley 7a, there are formed a plurality of recesses 19 (four in this case) parallel to each other and over the whole periphery thereof, with the respective sections being in a V-shape. An endless belt 15 (see FIG. 6) spanning between such a driven pulley 7a and a drive pulley (not shown) is provided wherein a plurality of ribs (four in this case) are formed continuously over the whole inner periphery, with the respective sections being in a V-shape.

Between the outer peripheral face of the sleeve 8a constituted as described above and the inner peripheral face of the driven pulley 7a constituted as described above, there are provided the pair of support bearings 17a, 17b, respectively being radial roller bearings, and a one-way clutch 18 being a roller clutch. To constitute the one-way clutch 18 of these, an inner ring 20 for the one-way clutch is externally fitted and secured by interference fit to the outer peripheral face in the intermediate portion of the sleeve 8a. The inner ring 20 for the one-way clutch is formed in an overall cylindrical shape from a plate material made of a hard metal such as bearing steel or the like, or a plate material of steel for carburizing such as SCM 415 or the like, with the outer peripheral face being a cam face 21 described later.

Moreover, to construct the respective support bearings 17a, 17b, inner rings 22 are respectively externally fitted and secured by interference fit to the outer peripheral face of the sleeve 8a at opposite ends. These respective inner rings 22 which are similarly formed from a plate material made of a hard metal such as bearing steel or the like, or a plate material of steel for carburizing such as SCM 415 or the like, are each formed in an overall cylindrical shape to give an L-shape in cross-section, by forming an inner ring side brim portion 24 in a radially outwards oriented flange shape at one end rim of a cylindrical portion 23.

These inner rings 22 are externally fitted to the sleeve 8a with the inner ring side brim portions 24 located at opposite sides to each other, and with end rims thereof respectively abutted against axially opposite end portions of the inner ring 20 for the one-way clutch. In this case, the outer diameter of the cylindrical portion 23 of the respective inner rings 22 is made larger than that of an inscribed circle related to the bottom portion of a plurality of recesses 25 formed on the outer peripheral face of the inner ring 20 for the one-way clutch.

On the other hand, an outer ring 26 is internally fitted and secured by interference fit to the driven pulley 7a. The outer ring 26 serves not only as an outer ring for the one-way clutch 18, but also as an outer ring for the respective support bearings 17a, 17b, and is also formed in an overall cylindrical shape by subjecting a plate material made of a hard metal such as bearing steel or the like, or a plate material of steel for carburizing such as SCM 415 or the like to press working. Such an outer ring 26 is formed with outer ring side brim portions 27a, 27b, respectively in a radially inwards oriented flange shape, at axially opposite end portions. Here, of these outer ring side brim portions 27a, 27b, one outer ring side brim portion 27a (left side in FIG. 1) has a thickness similar to that of the body portion of the outer ring 26 because of being formed prior to the assembly of the other constituent members. On the other hand, the other outer ring side brim portion 27b (right side in FIG. 1) is made thin because of being formed after assembly of the other constituent members.

Then, the one-way clutch 18 is constructed including the inner peripheral face of the intermediate portion of the outer ring 26 and the outer peripheral face of the inner ring 20 for the one-way clutch. That is to say, in a plurality of places on the outer peripheral face of the inner ring 20 for the one-way clutch, there are formed respective recesses 25, referred to as ramps, whose depths increase towards one circumferential end side (the right side in FIG. 2), axially over the inner ring 20 for the one-way clutch, and at equal spacing circumferentially to each other, with the outer peripheral face of the inner ring 20 for the one-way clutch being the cam face 21. Between the outer peripheral face of the inner ring 20 for the one-way clutch ad the inner peripheral face of the outer ring 26, there is formed a cylindrical gap 28. Of the dimensions of the cylindrical gap 28, the height in cross-section related to the diametral direction of the outer ring 26 is larger than the outer diameter of the plurality of rollers 29 disposed inside the cylindrical gap 28, in portions corresponding to the respective recesses 25, and in portions away from the respective recesses 25, is smaller than the outer diameter of the respective rollers 29.

Moreover, the one-way clutch 18 is respectively provided with a clutch retainer 30 formed in a cylindrical cage shape from a synthetic resin, and a plurality of rollers 29 and springs 39, between the inner peripheral face in the intermediate portion of the outer ring 26 and the outer peripheral face of the inner ring 20 for the one-way clutch. Of these, the clutch retainer 30 is mounted inside the outer ring 26, with rotation thereof relative to the inner ring 20 for the one-way clutch being made impossible, by making protrusions 31 formed on the inner peripheral face engage with the recesses 25 formed on the outer peripheral face of the inner ring 20 for the one-way clutch. In addition, one axial face of the protrusions 31 is made to face the end rim of respective inner rings 22, thereby preventing the clutch retainer 30 from shifting axially. The plurality of rollers 29 are held inside pockets 32 formed in the clutch retainer 30, with rolling and some circumferential displacement being made possible.

The respective springs 39 are also disposed between pillar portions 40 constituting the clutch retainer 30 as described above and the respective rollers 29, to resiliently press the respective rollers 29 circumferentially in the same direction (in the leftward direction in FIG. 2). Here, the respective springs 39 are generally plate springs made of stainless steel by bending back a strip-form spring plate in a U-shape or a V-shape, or synthetic resin springs formed integrally with the retainer.

The respective support bearings 17a, 17b comprise the respective inner rings 22 and portions near the axially opposite ends of the outer ring 26. That is to say, between the outer peripheral face of the respective inner rings 22 and the inner peripheral face of portions near the axially opposite ends of the outer ring 26, there are disposed bearing retainers 33 formed in a cylindrical cage shape from a synthetic resin, and a plurality of rollers 34 held so as to be freely rollable by the bearing retainers 33, to thereby form radial roller bearings.

Furthermore, between the outside face of the outer ring side brim portions 27a, 27b and the inside face of the inner ring side brim portions 24, there are respectively mounted floating washers 35, freely rotatable relative to the respective outer ring side brim portions 27a, 27b and the inner ring side brim portions 24. The respective floating washers 35 are formed in a ring shape from metals having a self-lubricating property such as copper or the like, metals subjected to tufftriding, metal materials impregnated with a lubricating oil such as porous metal or the like, or synthetic resins having a low coefficient of friction such as polyamide resin, polyacetal resin, polytetrafluoroethylene resin or the like. These floating washers 35 are loosely inserted between the outer ring side brim portions 27a, 27b and the inner ring side brim portions 24. The floating washers 35 are guided (kept from displacement in the radial direction) by the outer peripheral faces of the respective inner rings 22 and the inner peripheral face of the driven pulley 7a.

Moreover, gaps between the inner peripheral face at the axially opposite end portions of the outer ring 26 and the outer peripheral face of the respective inner rings 22 are respectively covered with seal rings 36a, 36b. These seal rings 36a, 36b respectively comprise a metal core 37 and a resilient member 38, and are internally fitted and supported on the inner peripheral face at opposite end portions of the outer ring 26 with the outer diameter of the resilient member 38 being resiliently reduced. Edge rims of a plurality of seal lips respectively provided on each resilient member 38 are then slidingly contacted with or abutted against the outer peripheral faces of the intermediate portions of the inner rings 22 and the inside faces of the respective outer ring side brim portions 27a, 27b. Here, in the case of this example, the one edge rim of one seal ring 36a (the left one in FIG. 1) of the respective seal rings 36a, 36b is slidingly contacted or abutted against the inside face of one outer ring side brim portion 27a, so that positioning in the axial direction of one seal ring 36a relative to the outer ring 26 is effected. On the other hand, of the respective seal rings 36a, 36b, one edge rim of the other seal ring 36b (the right one in FIG. 1) is abutted against a stepped face between the other outer ring side brim portion 27b and the body portion of the outer ring 26. Concurrently, the other end rim of the other seal ring 36b is slidingly contacted with or abutted against the inside face of the other outer ring side brim portion 27b, thereby effecting positioning in the axial direction of the other seal ring 36b relative to the outer ring 26.

Furthermore, portions on one side face of the metal cores 37 of the respective seal rings 36a, 36b facing the end face of the bearing retainers 33 constituting the respective support bearings 17a, 17b are arranged so as not to be covered by the resilient members 38, so that even if the end faces of the bearing retainers 33 and the one side faces of the metal cores 37 are slidingly contact with each other, the sliding resistance an be kept low.

In particular, in the case of the alternator pulley unit with a built-in one-way clutch of the present invention, a torque necessary for rotating the driven pulley 7a relative to the sleeve 8a in the direction to give overrun is made as small as about 0.35N·m (0.5N·m or less). Hence, in the case of this example, the elastic constant of respective springs 39 constituting the one-way clutch 18, the sliding resistance of the pair of seal rings 36a, 36b with respect to the respective inner rings 22, and the rolling rotation resistance of the pair of support bearings 17a, 17b are respectively made not higher than predetermined values. Therefore, in the case of this example, to decrease the sliding resistance of the pair of seal rings 36a, 36b, the interference of the edge rims of the seal lips of the resilient members 38 constituting the respective seal rings 36a, 36b, relative to the inner rings 22 is restricted to a range of approximately from 0 to 0.2 mm.

According to the alternator pulley unit with a built-in one-way clutch of the present invention constructed as described above, the one-way clutch 18 transmits only a turning force in a predetermined direction between the driven pulley 7a to which the outer ring 26 is internally fitted and secured, and the rotation shaft 3. For example, in FIG. 2 if it is assumed that the inner ring 20 for the one-way clutch is fixed and only the outer ring 26 rotates, in the case where the outer ring 26 rotates in the clockwise direction in FIG. 2, the respective rollers 29, based on a force received from the inner peripheral face of the outer ring 26, oppose the resilience force of the respective springs 39 and tend to be displaced to the side where respective recesses 25 become deep. The respective rollers 29 are then able to roll inside the cylindrical gap 28, so that a so-called overrun state results wherein a turning force cannot be transmitted between the outer ring 26 and the inner ring 20 for the one-way clutch. On the other hand, when the outer ring 26 rotates in the counterclockwise direction in FIG. 2, the respective rollers 29 encroach into a wedge shape at a portion where the respective recesses 25 become shallow, as shown by the two dot chain line in FIG. 2, based on a force that respective rollers 29 receive from the inner peripheral face of the outer ring 26 and the resilience force of respective springs 39, thus integrally coupling the outer ring 26 and the inner ring 20 for the one-way clutch, so that a so-called locked state results wherein a turning force can be freely transmitted between the outer ring 26 and the inner ring 20 for the one-way clutch.

Moreover, in the case of the present invention, the torque necessary for rotating the driven pulley 7a relative to the sleeve 8a in the direction to give overrun is made as small as about 0.35N·m. Therefore, if the predetermined direction is appropriate relative to the rotation direction of the crank shaft, when the rotational speed of the engine is constant or tends to increase, the turning force can be freely transmitted from the driven pulley 7a to the rotation shaft 3, and when the rotational speed of the engine tends to decrease, the driven pulley 7a and the rotation shaft 3 can be promptly rotated relative to each other, thereby effecting the overrun state. As a result, regardless of variations in the rotational speed of the engine, the rotation of the alternator can be maintained sufficiently in the high region, to ensure the power generating efficiency, and the occurrence of abnormal sounds due to slipping between the driven pulley 7a and the endless belt 15 wrapped around the driven pulley 7a, and a decrease in the life span of the endless belt 15 can be prevented.

Furthermore, in the case of this example, since the torque necessary for rotating the driven pulley 7a relative to the sleeve 8a in the direction to give overrun is made as small as about 0.35N·m, the pulley unit can sufficiently cope with slight variations in the turning angular velocity which are caused during one rotation of the engine crank shaft, and when the running speed of the endless belt 15 tends to decrease, the driven pulley 7a and the rotation shaft 3 can be freely rotated relative to each other, thereby effecting the overrun condition. As a result, according to the present invention, the pulley unit can cope not only with variations in the rotational speed of the engine but also with slight variations in the turning angular velocity, ensuring the power generating efficiency of the alternator, as well as enabling the prevention of the occurrence of abnormal sounds, and of a decrease in the life span of the endless belt.

Figure 3:
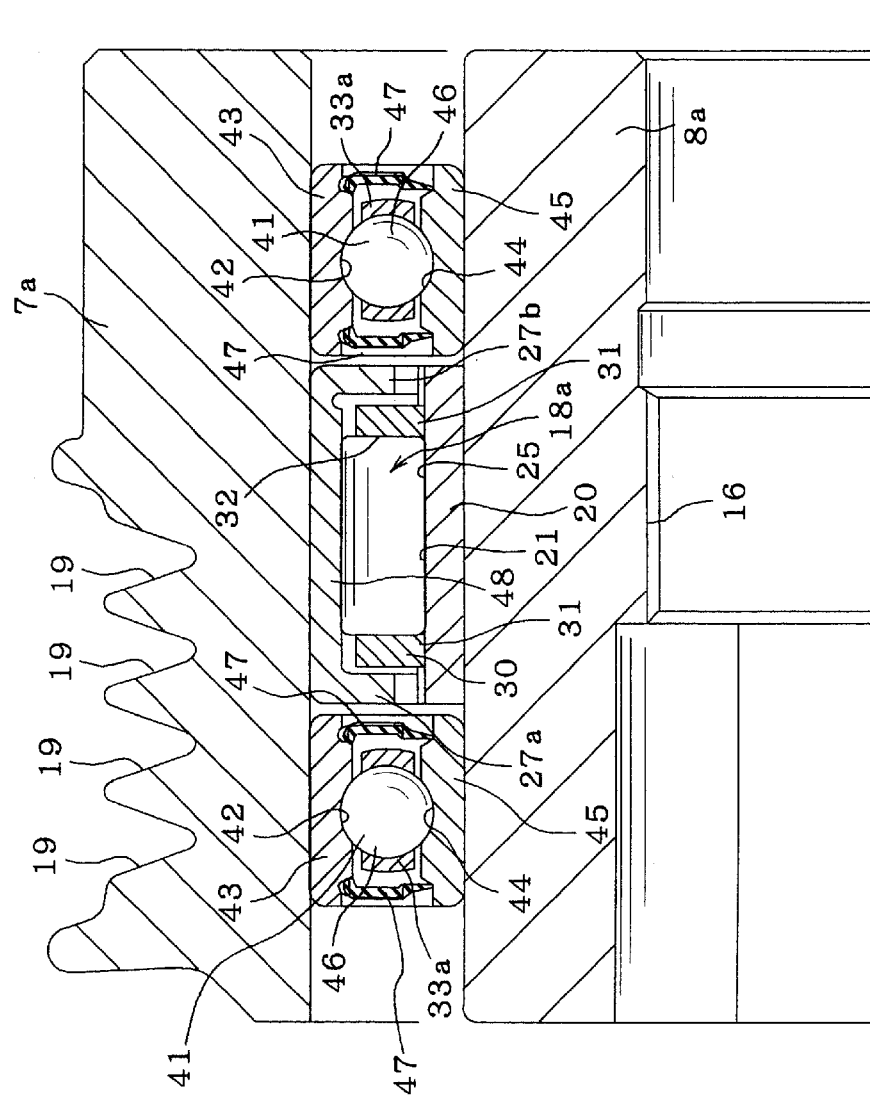
FIG. 3 is a cross sectional view of one half of a second example of the embodiment of the present invention.

FIG. 3 shows a second example of the embodiment of the present invention. In the case of this example, a pair of support bearings 41, each being a deep groove ball bearing, and a one-way clutch 18a being a roller clutch are disposed between the outer peripheral face of the sleeve 8a and the inner peripheral face of the driven pulley 7a. The pair of support bearings 41 of these comprises, respectively, an outer ring 43 having a deep groove outer ring raceway 42 on an inner peripheral face, an inner ring 45 having a deep groove inner ring raceway 44 on an outer peripheral face, a plurality of balls 46 being rolling bodies disposed so as to be freely rollable between the outer ring raceway 42 and the inner ring raceway 44, a bearing retainer 33a for holding thee balls 46 so as to be freely rollable, and a pair of seal rings 47 disposed between the inner peripheral face at opposite end portions of the outer ring 43 and the outer peripheral face at opposite end portions of the inner ring 45. These respective support bearings 41 are disposed between portions near the opposite ends on the outer peripheral face of sleeve 8a and portions near the opposite ends on the inner peripheral face of the driven pulley 7a, by internally fitting and securing the outer rings 43 by interference fit to portions near the opposite ends on the inner peripheral face of the driven pulley 7a, and externally fitting and securing the inner rings 45 by interference fit to portions near the opposite ends on the outer peripheral face of the sleeve 8a. Additionally, the outer peripheral rim portions of the respective seal rings 47 are secured on the inner peripheral faces at the ends of respective outer rings 43, and the inner peripheral rim portions thereof are slidingly contacted with the outer peripheral faces at the ends of the respective inner rings 45.

Moreover, the one-way clutch 18a is disposed between the intermediate portion on the outer peripheral face of the sleeve 8a and the intermediate portion on the inner peripheral face of the driven pulley 7a. In the case of this example, the axial length of an outer ring 48 for the one-way clutch constituting the one-way clutch 18a is made shorter than that of the outer ring 26 (FIGS. 1, 2) in the case of the first example described above, thereby making the outer ring 48 for the one-way clutch separate from the outer rings 43 constituting the pair of support bearings 41. The inside faces of the outer ring side brim portions 27a, 27b disposed at axially opposite ends of the outer ring 48 for the one-way clutch are respectively made to face the end faces of the clutch retainers 30. In addition, in the case of this example, the torque necessary for rotating the driven pulley 7a relative to the sleeve 8a in the direction to give overrun is made as small as about 0.25N·m (0.3N·m or less).

According to the structure in this example constructed as described above, the torque necessary for rotating the driven pulley 7a relative to the sleeve 8a in the direction to give overrun is made about 0.25N·m, which is even smaller than the case of the first example described above. Hence, the pulley unit can further cope with slight variations in the turning angular velocity of the crank shaft, compared to the case of the first example. Moreover, according to the structure in this example, even if the tension of the endless belt 15 (see FIG. 6) decreases to about 30 kgf, the pulley unit can follow the variations in the turning angular velocity to ensure the power generating efficiency of the alternator, as well as enabling the prevention of the occurrence of abnormal sounds, and of a decrease in the life span of the endless belt 15.

Other construction and operation are similar to those in the case of the first example described above. Hence similar parts are denoted by the same symbols and repeated description thereof is omitted.

Figure 4:
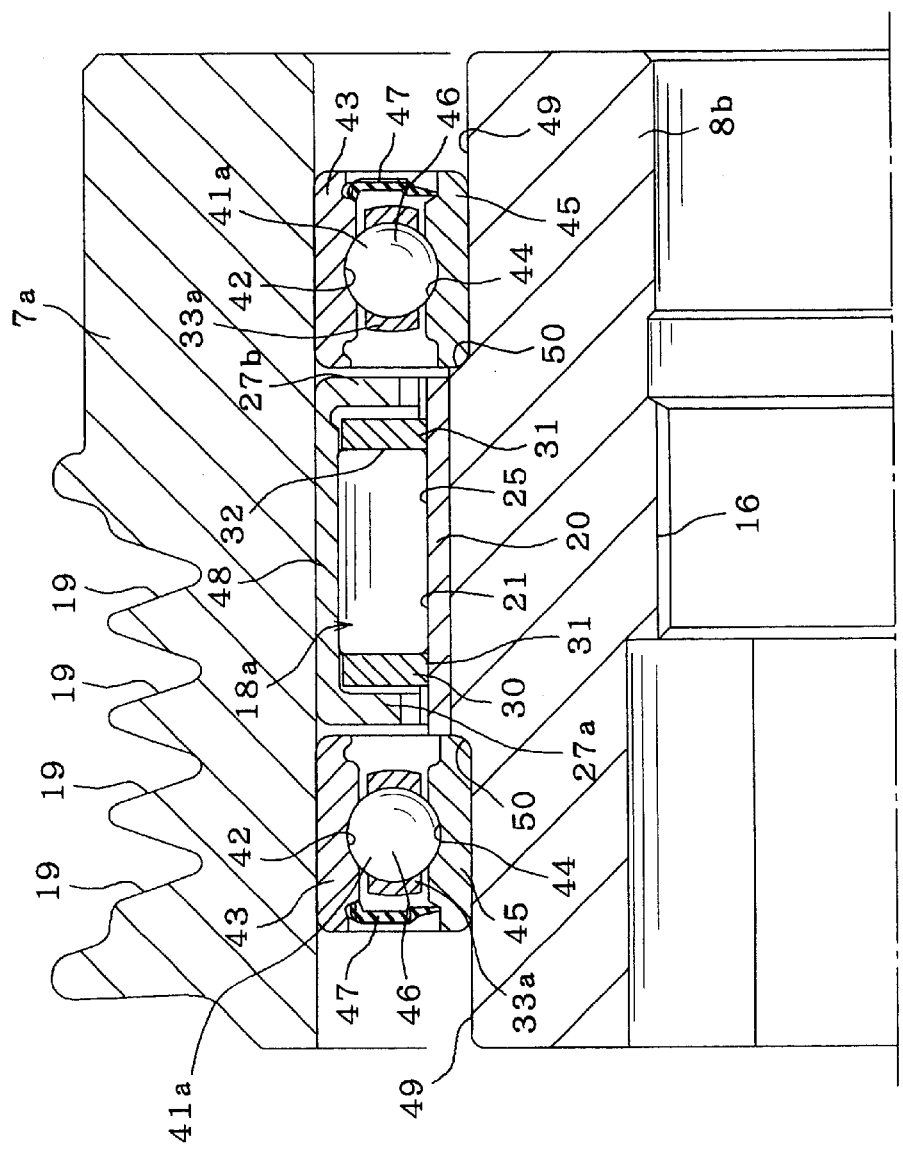
FIG. 4 is a cross sectional view of one half of a third example of the embodiment of the present invention.

FIG. 4 shows a third example of the embodiment of the present invention. In the case of this example, differing from the case of the second example described above, the respective support bearings 41a are provided with the seal rings 47 disposed only on one end portion on the side closer to the axially opposite ends of the driven pulley 7a and the sleeve 8b. Hence, in the case of this example, the sliding resistance of the seal rings 47 in the whole pulley unit can be reduced, enabling a decrease in the torque necessary for rotating the driven pulley 7a relative to the sleeve 8b in the direction to give overrun to about 0.20N·m (0.3N·m or less), which is even smaller than the case in the second example described above. Moreover, in the case of this example, small diameter portions 49 are formed on the outer peripheral face at opposite ends of the sleeve 8b. When the respective inner rings 45 constituting the respective support bearings 41a are externally fitted and secured by interference fit, on the respective outer peripheral faces of the sleeve 8b, axial displacement of the respective support bearings 41a relative to the sleeve 8b can be prevented by abutting one end face of the respective inner rings 45 against stepped portions 50 being a continuous portion of the small diameter portion 49 and the body portion.

Other construction and operation are similar to those in the case of the second example described above. Hence similar parts are denoted by the same symbols and repeated description thereof is omitted.

Incidentally, in the case of the respective examples described above, the description has been given of a structure where the one-way clutch is a roller clutch using rollers as a plurality of lock members. However, the present invention is not limited to such a structure, and is also applicable to a structure wherein the one-way clutch is a sprag one-way clutch using sprags as the plurality of lock members.

Since the alternator pulley unit with a built-in one-way clutch of the present invention is constructed and operates as described above, the power generating efficiency of the alternator can be ensured, and the occurrence of abnormal sounds, and a decrease in the life span of the endless belt can be sufficiently prevented. As a result, a reduction in size of an alternator incorporating this pulley unit can be realized.

What is claimed is:

1. An alternator pulley unit with a built-in-one-way clutch comprising a sleeve that can be freely externally fitted and secured to a rotation shaft of the alternator; a driven pulley disposed concentric with the sleeve around the sleeve; a one-way clutch provided between an axially intermediate portion on an outer peripheral face of the sleeve and an axially intermediate portion on an inner peripheral face of the driven pulley, which can freely transmit a turning force between the driven pulley and the sleeve, only when the driven pulley tends to rotate relative to the sleeve in a predetermined direction; and a pair of support bearing provided between the outer peripheral face of the sleeve an the inner peripheral face of the driven pulley to hold the one-way clutch from the axially opposite sides, which enable free rotation of the sleeve and the driven pulley relative to each other, while rotatably supporting a radial load applied to the driven pulley, wherein a torque necessary for rotating the driven pulley relative to the sleeve in the direction opposite to the predetermined direction is limited up to 0.5N·m.

2. The alternator pulley unit with a built-in one-way clutch of claim 1, wherein the torque necessary for rotating the driven pulley relative to the sleeve in the direction opposite to the predetermined direction is 0.3N·m or less.

3. The alternator pulley unit with a built-in one-way clutch of claim 2, wherein the pair of support bearings are ball bearings.

4. The alternator pulley unit with a built-in one-way clutch of claim 1, wherein the pair of support bearings are ball bearings.

* * * * *